(12) United States Patent
Behrendt et al.

(10) Patent No.: US 7,894,066 B2
(45) Date of Patent: Feb. 22, 2011

(54) METHOD AND APPARATUS FOR CARRYING OUT A BURNING TEST ON A TEST PIECE

(75) Inventors: Martin Behrendt, Meerbusch (DE); Bahman Sarabi, Krefeld (DE); Wilfried Teeting, Breitscheidt (DE)

(73) Assignee: Underwriters Laboratories Inc., Northbrook, IL (US)

( * ) Notice: Subject to any disclaimer, the term of this patent is extended or adjusted under 35 U.S.C. 154(b) by 323 days.

(21) Appl. No.: 12/172,353

(22) Filed: Jul. 14, 2008

(65) Prior Publication Data
US 2009/0015837 A1 Jan. 15, 2009

(30) Foreign Application Priority Data
Jul. 13, 2007 (DE) .................. 10 2007 032 665

(51) Int. Cl.
*G01N 21/25* (2006.01)
(52) U.S. Cl. ..................................... 356/417
(58) Field of Classification Search .................. 356/417
See application file for complete search history.

(56) References Cited

U.S. PATENT DOCUMENTS

| | | | |
|---|---|---|---|
| 4,567,347 A * | 1/1986 | Ito et al. ................ | 219/124.34 |
| 6,909,066 B2 * | 6/2005 | Zheng et al. ............. | 219/130.5 |
| 2002/0024672 A1 * | 2/2002 | Shibamoto .................. | 356/417 |
| 2007/0048682 A1 * | 3/2007 | Bartel et al. ................ | 431/154 |

OTHER PUBLICATIONS

IEC, "Fire Hazard Testing", 60695-11-20, Edition 1.1, (Aug. 2003), pp. 23-27, Figure 2 (p. 31), p. 37.
IEC, "Fire Hazard Testing", 60695-11-10, Edition 1.1, (Aug. 2003), pp. 27-33, Figure 3 (p. 39), p. 49, pp. 23-26, Figure 1 (p. 35) and p. 47.

* cited by examiner

*Primary Examiner*—Roy Punnoose
(74) *Attorney, Agent, or Firm*—Marshall, Gerstein & Borun LLP

(57) ABSTRACT

The image data capture of a test piece is performed with at least one first camera. A reference point of the test piece is determined by processing the image data recorded with the at least one first camera. A burner is positioned at a prescribed first distance from the reference point for the flame exposure of the test piece. At least one second camera may also detect whether the test piece exposed to a flame is burning or incandescing. At least one third camera may be used for monitoring the burner flame and at least one fourth camera may be used for determining whether the test piece drips while burning. Furthermore, at least one detector may used for detecting whether the drips ignite a pad of wadding positioned under the test piece.

39 Claims, 8 Drawing Sheets

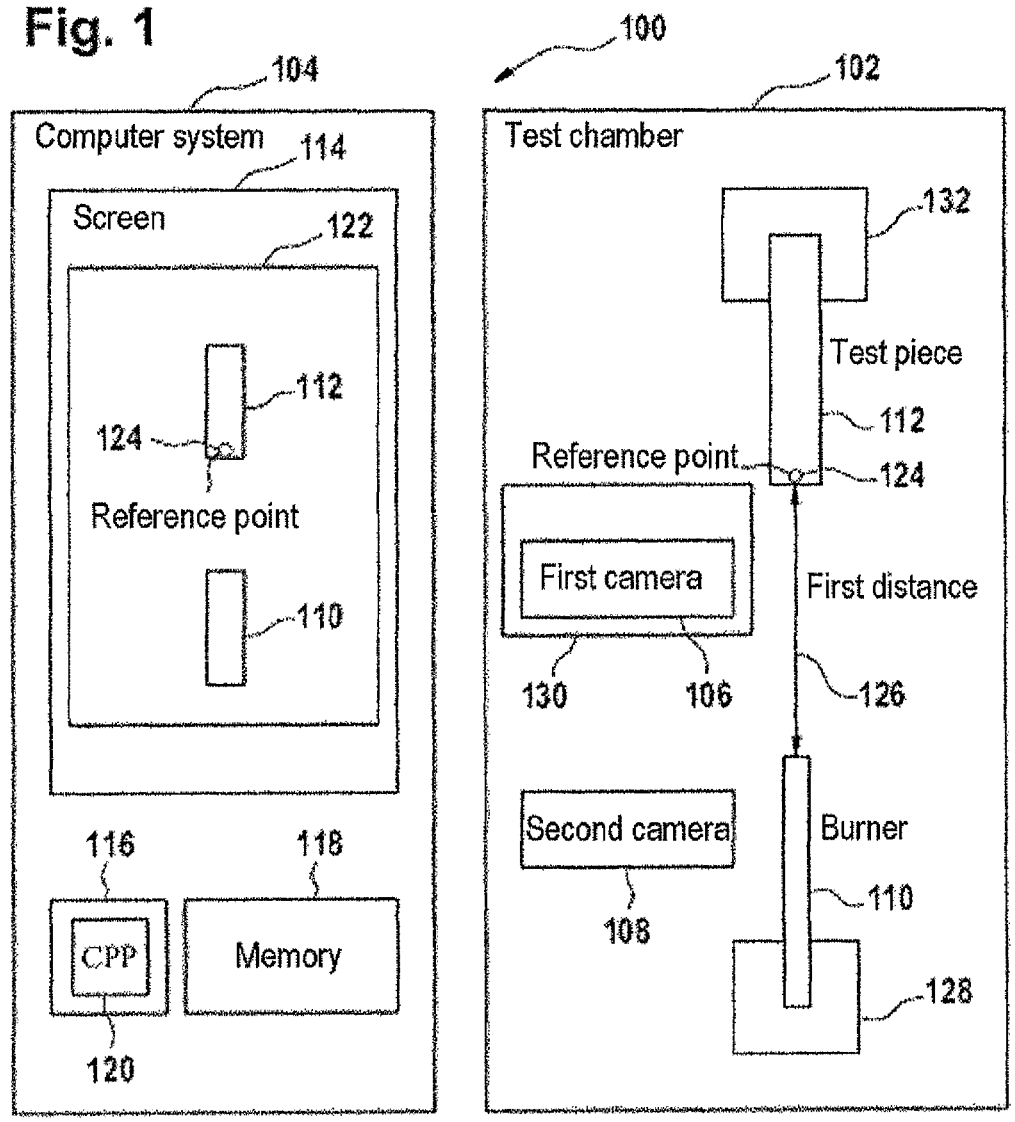
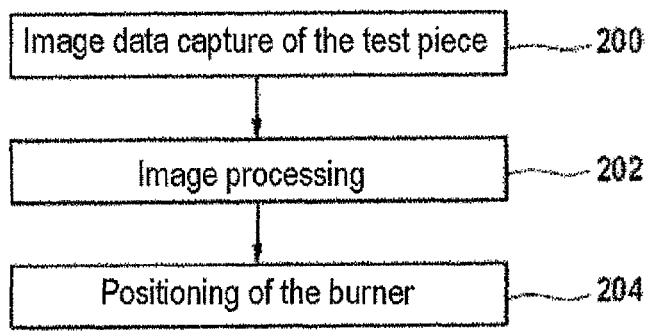

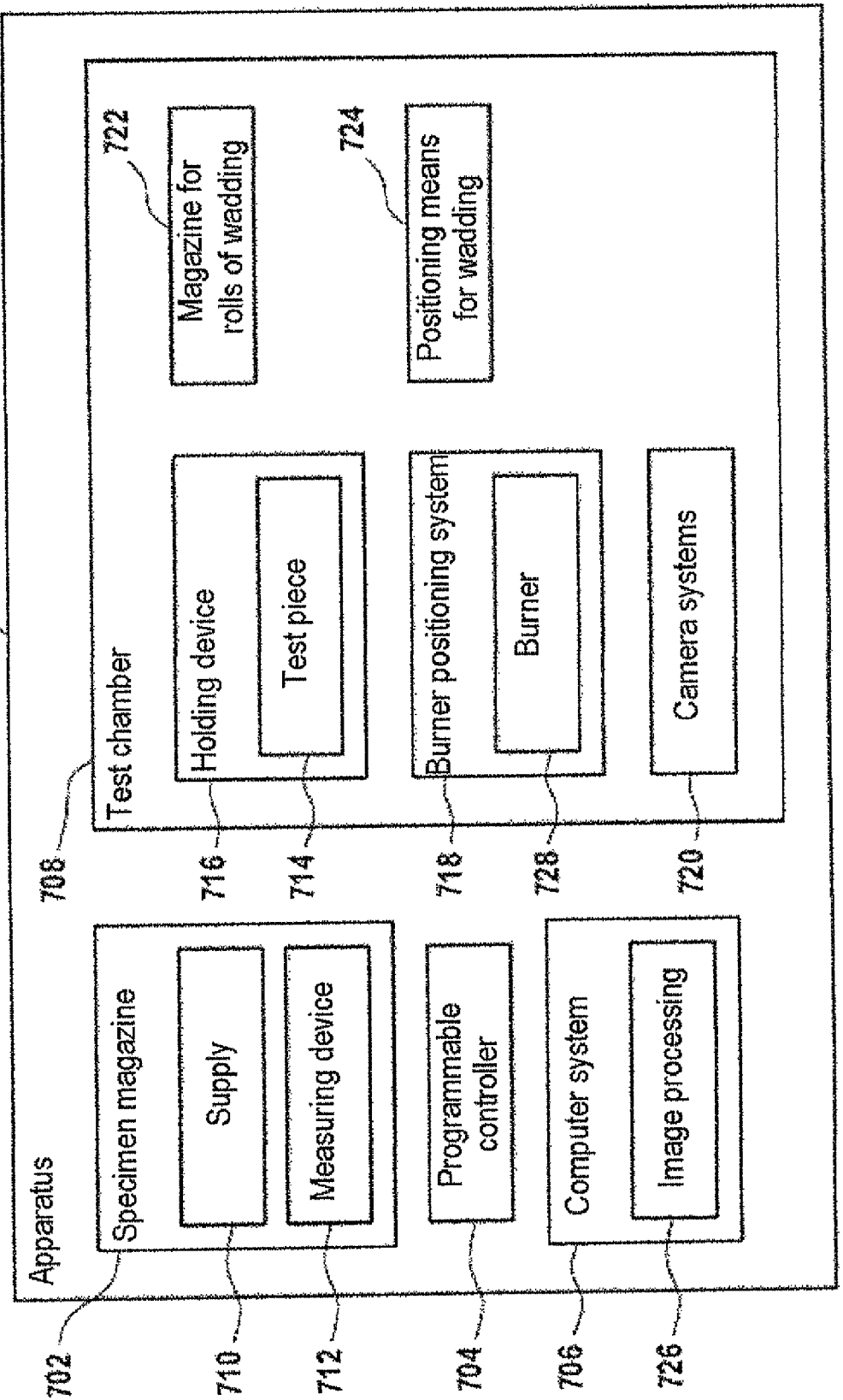

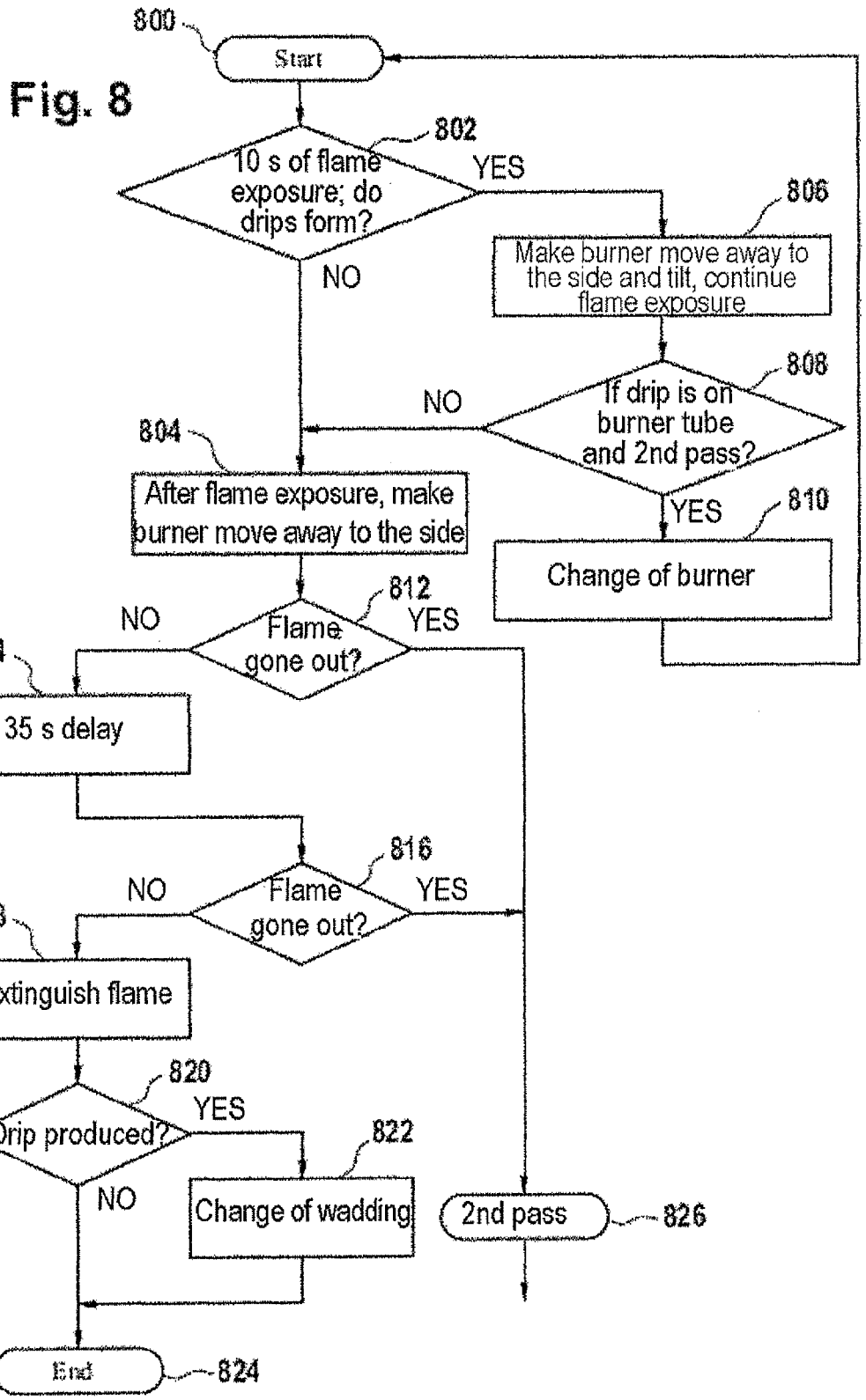

METHOD AND APPARATUS FOR CARRYING OUT A BURNING TEST ON A TEST PIECE

PRIORITY

Priority is claimed to German Patent Application No. DE 10 2007 032 665.5, filed Jul. 13, 2007. The aforementioned priority document is incorporated herein by reference in its entirety.

BACKGROUND OF THE INVENTION

1. Field of the Invention

The field of the present invention relates to a method and an apparatus for carrying out a burning test on a test piece.

2. Background

Materials are working resources of a purely substance-like nature that are further processed as objects of work in production processes and are subsumed in the respective end products. They are generally solid bodies, such as for instance metals or plastics. Before the end products produced from corresponding materials can be sold by the manufacturer, the end products must undergo a large number of tests, to rule out possible hazards arising from the product for a product user and accordingly also minimize the manufacturer's risk of liability. Therefore, end products are, for example, subjected to a fire test, to be able to assess the end product with regard to the fire hazard.

Furthermore, the materials used for the manufacture of the end products are subjected to what is known as preselection testing. In preselection testing, it is not that the entire product as such is investigated for its fire hazard, but instead the individual materials that are used for an end product are investigated for their burning properties. Preselection tests on materials are usually performed on test pieces that consist of the material to be tested and have a simple, standardized form, such as for example that of rectangular bars.

For example, European Standard EN 60695-11-10 specifies a test method for assessing the fire hazard of materials. According to one variant of the test method, known as the vertical burning test, a burner is held at a distance of 10 millimeters under a bar-shaped test piece, which is suspended vertically with respect to its longitudinal axis, for two periods of 10 seconds. The flame is in this case set to a nominal value of 50 watts. After completion of each instance of flame exposure of the test piece, what is known as the burning time of the test piece is determined, and then the test piece is categorized on the basis of the burning times determined in various categories that are specified more precisely in the aforementioned standard.

According to the prior art, methods for fire testing, such as for example for carrying out the method described in the aforementioned European standard, are carried out by operating personnel, who, for the flame exposure, hold a burner at the distances set out in the respective standard from the test piece for the times specified in the standard. However, it is clear that a test method carried out by personnel is also prone to subjective, personal influences. For example, the distance between the burner and the test piece will only approximately correspond to the distance that is prescribed in the standard.

SUMMARY OF THE INVENTION

The present invention is directed toward a method and apparatus for carrying out a burning test on a test piece. The method comprises capturing image data of the test piece with at least one first camera. Image processing of the image data recorded with the at least one first camera is also performed, so that a reference point of the test piece can be determined. Further, the burner is positioned at a prescribed first distance from the reference point for the flame exposure of the test piece.

The test piece is optically captured by at least a first camera. The image data thereby obtained are processed in the image processing, the reference point being determined by way of a projected image of the test piece. The reference point is an "imaginary" point in the test piece that is determined by way of the image processing. The burner is positioned at the first distance from the reference point fully automatically. This has the advantage that the distance between the burner and the reference point consequently always corresponds to the first distance within a certain tolerance range. Consequently, substantially the same first distance can be realized for all material test pieces that are subjected to the burning test. The first distance is in this case preferably measured in relation to the tip of the burner.

According to a separate aspect of the invention, the at least one first camera also has an interference bandpass filter for suppressing the detection of the burner flame. In the recording of the material, it is particularly important to avoid disturbing influences of the burner flame, in order that the outlines of the test piece can be distinctly determined by means of the image processing. According to this variant of the method, this can consequently be realized by an interference bandpass filter with a low transmittivity for the light of the burner flame being arranged in front of the at least one first camera.

According to another separate aspect of the invention, the at least one first camera is a black-and white-camera, preferably a CMOS high-speed camera. As a result, the detection of the burner flame can be suppressed, for example in combination with the interference bandpass filter.

According to yet another separate aspect of the invention, the at least one first camera is irradiated by a red light emitter for suppressing the detection of the burner flame, the red light emitter also illuminating the test piece. The red light emitter swamps out the burner flame, so that the camera substantially records the shadow cast by the red light emitter, the shadow cast corresponding to the outlines of the test piece.

According to yet another separate aspect of the invention, the at least one first camera also has a polarization filter. Furthermore, the light from the red light emitter or the red light emitters is linearly polarized and the polarization filter of the first camera is aligned in such a way that it has a low filtering effect for the linearly polarized light. On the one hand, the red light emitter or the red light emitters swamp out the burner flame and on the other hand the detection of the flame by the camera is suppressed by ensuring by means of the linearly polarized filter that substantially only the light of the red light emitters is detected as background illumination, since the light emitted by the flame has no linear polarization.

According to yet another separate aspect of the invention, the image processing of the image data of the burner flame recorded with at least one second camera is also performed, the colour of the burner flame being determined by means of the image data. The colour of the burner flame is then compared with the colour of a desired flame, the burner being exchanged if the colour of the burner flame does not correspond substantially to the colour of the desired flame.

According to yet another separate aspect of the invention, furthermore, the image processing of the image data of the burner flame recorded with at least one second camera is performed. The second camera is preferably a colour camera. The testing of the flame is performed by determining the colour values of the flame according to the RGB colour model and comparison with prescribed colour values according to the RGB colour model or a desired flame. According to the RGB colour model, a colour is specified by way of three colour values. The first colour value gives the red component, the second colour value gives the green component and the third colour value gives the blue component in the colour. The components are typically specified in percent. Furthermore, the burner is exchanged if it is detected on the basis of the image processing that the colour values of the flame do not correspond to the colour values of the desired flame. By comparison of the RGB colour determined on the basis of the image data of the burner flame with the RGB colour of the desired flame, for example always before flame exposure of the test piece, it is ensured that the test piece is exposed to a test flame that is standardized and used as a basis for the burning test.

According to yet another separate aspect of the invention, repositioning of the test piece is performed, from a specimen magazine into a position in which the test piece can be optically captured by the at least one first camera and can be exposed to the flame of the burner, the specimen magazine being intended for receiving a large number of test pieces. The specimen magazine may be designed in such a way that it has, for example, a hot-air oven and a drying chamber, in order to realize storage of the specimens on the basis of the temperatures and humidity levels prescribed in the burning test standard.

According to yet another separate aspect of the invention, the image processing of the image data of the test piece recorded with at least one third camera is performed. Furthermore, it is determined on the basis of the image data recorded with the at least one third camera whether the test piece is burning. For the classification of the material of which the test piece consists in a category according to the standard on which the test is based, it may be necessary under some circumstances to determine whether a) the test piece is burning and b) for how long the test piece burns. According to the method, this can be realized by recording the test piece with a third camera, which is preferably a colour image camera. Image processing of the image data obtained in this way can then be used, for example, to determine the burning time of the test piece.

According to yet another separate aspect of the invention, the determination on the basis of the image data recorded with the at least one third camera of whether the test piece is incandescing is also performed. The image projected by a burning test piece will be significantly brighter than that of an incandescing test piece. This is in turn brighter than that of a test piece that is not incandescing and not burning. Threshold values may be prescribed for the image processing, in order to distinguish a burning test piece from an incandescing test piece or a non-burning test piece. If, for example, the average brightness of the recording of the test piece exceeds a first threshold value, the test piece is recognized as burning. If the average brightness lies between the first threshold value and a second threshold value, the test piece is classified as incandescing. Correspondingly, it is recognized by the image processing that the test piece is neither incandescing nor burning if the average brightness is lower than the second threshold value.

According to yet another separate aspect of the invention, the test piece is formed as a substantially rectangular bar. The test piece is suspended from a fixing means, the longitudinal axis of the test piece being vertically aligned. Image data of a first surface side and a second surface side are recorded with the at least one first camera. The first and second surface sides are aligned parallel to the longitudinal axis and the first and second surface sides are oriented substantially perpendicularly to each other. A first guide line, extending horizontally along the first surface side, and a second guide line, extending horizontally along the second surface side, are determined by the image processing, the reference point corresponding to the point of intersection of the first and second guide lines projected towards the middle of the bar.

In the image processing, preferably two sides of the rectangular, bar-shaped test piece are detected and evaluated, a guide line being respectively determined for each surface side and then used for determining the reference point.

According to yet another separate aspect of the invention, the first guide line extends as far down as possible through the first surface side of the upright test piece and has at least a first prescribed minimum length. The second guide line extends at the same height as the first guide line.

According to yet another separate aspect of the invention, the capture of a first region of the first surface side is also performed, the first region comprising the first surface side under the first guide line. Also, if the region has a prescribed minimum height and a prescribed minimum width, a thread is detected.

According to yet another separate aspect of the invention, the image data capture of a second region by the at least one first camera is also performed, the second region lying between the test piece and the burner. By the image capture of the image data of the second region that are recorded with the at least one first camera, a drip is detected if a part of the test piece that has become detached from the test piece and is moving in the second region is detected in the image data. The moving part corresponds to a drip coming away from the test piece. The drip may be detected if it has a prescribed minimum size and is falling at a prescribed minimum rate or greater. The first camera is therefore preferably a high-speed camera, since in this way the falling drip can be detected particularly easily.

According to yet another separate aspect of the invention, the positioning of cotton wadding at a prescribed second distance under the test piece is also performed, the cotton wadding being optically captured by at least one fourth camera or some other optical detector, it being determined by means of image processing of the image data captured by means of a fourth camera or the optical detector whether a drip coming away from the test piece ignites the cotton wadding. The cotton wadding may be kept for example in the form of a roll of wadding in a wadding roll magazine. In this case, the wadding roll magazine is shielded in a way similar to the aforementioned specimen magazine by means of silica gel, in order to achieve climatic storage conditions prescribed in a test standard. A pad of wadding can be cut off from the roll of wadding by a wadding portioning system and be brought to the prescribed second distance under the test piece by means of a positioning system. The wadding portioning system may in this case be formed in such a way that the pad of wadding cut out from the wadding roll magazine has a size of 50 mm×50 mm and does not exceed a weight of 0.08 g. If the pad of wadding is ignited for example by burning parts of the test piece dripping down, this can likewise be detected by way of the image processing and the burning pad of wadding can be extinguished by means of nitrogen nozzles.

According to yet another separate aspect of the invention, the test piece is exposed to a flame for a prescribed first time period, the burner being positioned at the prescribed first distance under the reference point, the centre axis of the burner being vertically aligned and the first distance being corrected during the flame exposure. Repositioning of the burner after the first time period has elapsed is performed, so that the burner no longer has any influence on the test piece. For example, the burner is removed in a horizontal direction of movement to a maximum distance of 150 millimeters from the test piece. In a second method step, the determination of a first burning time of the test piece is performed, the first burning time corresponding to the time span between the end of the first time period and the point in time that the test piece is extinguished. Furthermore, as soon as the test piece is no longer burning, the test piece is exposed to a flame for a prescribed second time period. Following that, the determination of the second burning time of the test piece is performed, the second burning time corresponding to the time span between the end of the second time period and the point in time that the test piece is extinguished. If a drip is detected, the centre axis of the burner is tilted during the flame exposure of the test piece, the burner also optionally being removed from the test piece in a horizontal direction of movement, so that the drip does not influence the burner flame, and the burner being positioned again at the first distance under the test piece with a vertically aligned centre axis as soon as the drip has come away. In further method steps, the storing of the first and second burning times is performed, and optionally the storing of the information that a drip has come away from the test piece and optionally the storing of the burning of the pad of wadding positioned under the test piece.

According to yet another separate aspect of the invention, furthermore, it is determined by the image processing, by means of the image data recorded from the test piece, whether the test piece burns or incandesces through to its fixing means.

According to yet another separate aspect of the invention, the burning test piece is extinguished by means of nitrogen nozzles, for example after the end of the burning test.

According to yet another separate aspect of the invention, the method is carried out for a total of five test pieces of the same material. A classification of the material in the classes V-0, V-1 or V-2 according to EN 60965-11-10 is also performed. In this case, the first and second burning times, optionally the information whether one or more of the five test pieces has burned through or incandesced through to the fixing means, and also optionally a detected inflammation of the cotton wadding are used for the classification.

According to yet another separate aspect of the invention, the test piece is exposed to a flame five times, in each case for a prescribed third time period. The burner is in this case positioned at the prescribed first distance under the reference point, so that the centre axis of the burner is aligned approximately at an angle of 20° to the vertical. Furthermore, the distance is corrected during the flame exposure. After completion of the flame exposure, the burner is repositioned in each case for a prescribed fourth time period, so that it has no influence on the test piece during the fourth time period. Furthermore, a third burning time of the test piece is determined after the fifth flame exposure. The third burning time in this case corresponds to the time period between the completion of the fifth flame exposure and the point in time that the test piece is extinguished. Moreover, storing of the third burning time is performed, and optionally storing of the information that inflammation of the pad of wadding positioned under the test piece has taken place.

According to yet another separate aspect of the invention, the third burning time is determined for five test pieces of a material. The third burning times of the five test pieces and/or a detected inflammation of the cotton wadding are used for a classification according to DIN EN 60695-11-20 of the material of which the test pieces consist.

To carry out a burning test according to this standard, it is determined whether or not the total burning time is less than 60 seconds. The total burning time is calculated from the sum of the third burning times measured for the five test pieces. If the total burning time is less than 60 seconds, the test has been passed by the material. Otherwise, the test has not been passed. In the case of a test being passed, a further test is performed on a sheet consisting of the material, it being detected whether or not the flame exposure leads to a hole being formed in the sheet after a certain time. If a hole is formed, the material is assigned to class 5VB, if no hole is formed it is assigned to class 5VA.

According to yet another separate aspect of the invention, the test piece is formed as a substantially rectangular bar. Furthermore, the test piece is fixed in such a way that the longitudinal axis of the test piece extends substantially horizontally and the transverse axes are aligned substantially at an angle of 45° to the horizontal. A first mark and a second mark are provided transversely to the longitudinal axis. The first mark is in this case a prescribed fourth distance away from a third surface side of the test piece. Furthermore, the second mark is a prescribed fifth distance away from the third surface side. The third surface side in this case extends perpendicularly to the longitudinal axis of the test piece. A third guide line for the test piece is determined by the image processing, the third guide line extending along the lower edge of the material and the reference point being the point of intersection of the third guide line with the third surface side. The burner is positioned at the first distance from the reference point in such a way that the centre axis of the burner intersects the third guide line at an angle of 45° and the tip of the burner lies on the extended guide line.

According to yet another separate aspect of the invention, the flame exposure of the test piece is performed during a prescribed fifth time period or until the flame front reaches the first mark. Furthermore, a sixth time period is determined, the sixth time period corresponding to the time span until the flame front starting from the first mark reaches the second mark, or the time span until the flame starting from the first mark goes out. In a further method step, a length of damage to the test piece is determined by the image processing of the image data recorded from the burned-away test piece if the flame front goes out before reaching the second mark. The sixth time period and optionally the length of damage are stored.

According to yet another separate aspect of the invention, a classification of the material in the classes HB40 or HB75 according to EN 60695-11-10 is performed, using the sixth time periods, determined for three test pieces, and optionally the lengths of damage.

In yet another separate aspect of the invention, an apparatus for carrying out a burning test on a test piece includes at least one first camera for the optical capture of the test piece and means for the image processing of the image data recorded with the at least one first camera. The apparatus also has means for determining a reference point of the test piece on the basis of the recorded image data and means for positioning a burner at a prescribed first distance from the reference point, the burner being provided for the flame exposure of the test piece.

In yet another separate aspect of the present invention, any of the preceding aspects may be used in combination.

Accordingly, an improved method and apparatus for carrying out a burning test on a test piece are disclosed. Advantages of the improvements will appear from the drawings and the description of the preferred embodiment.

BRIEF DESCRIPTION OF THE DRAWINGS

In the drawings, wherein like reference numerals refer to similar components:

FIG. 1 shows a block diagram of an apparatus for carrying out a fire test,

FIG. 2 shows a flow diagram which reproduces steps of carrying out a fire test,

FIG. 7 shows a block diagram of an apparatus for carrying out a fire test, FIG. 8 shows a flow diagram which shows essential steps for carrying out the vertical burning test according to EN 60695-11-10, FIG. 9 schematically shows the arrangement of the test piece and the burner in the case of the vertical burning test according to EN 60695-11-10, FIG. 10 schematically shows the tilting away of the burner during the flame exposure of the test piece to avoid influencing of the burner flame by drips coming away from the test piece, FIG. 11 schematically shows the arrangement of the test piece and the burner in the case of the horizontal burning test according to EN 60695-11-10.

DETAILED DESCRIPTION OF THE PREFERRED EMBODIMENTS

Figure 3:
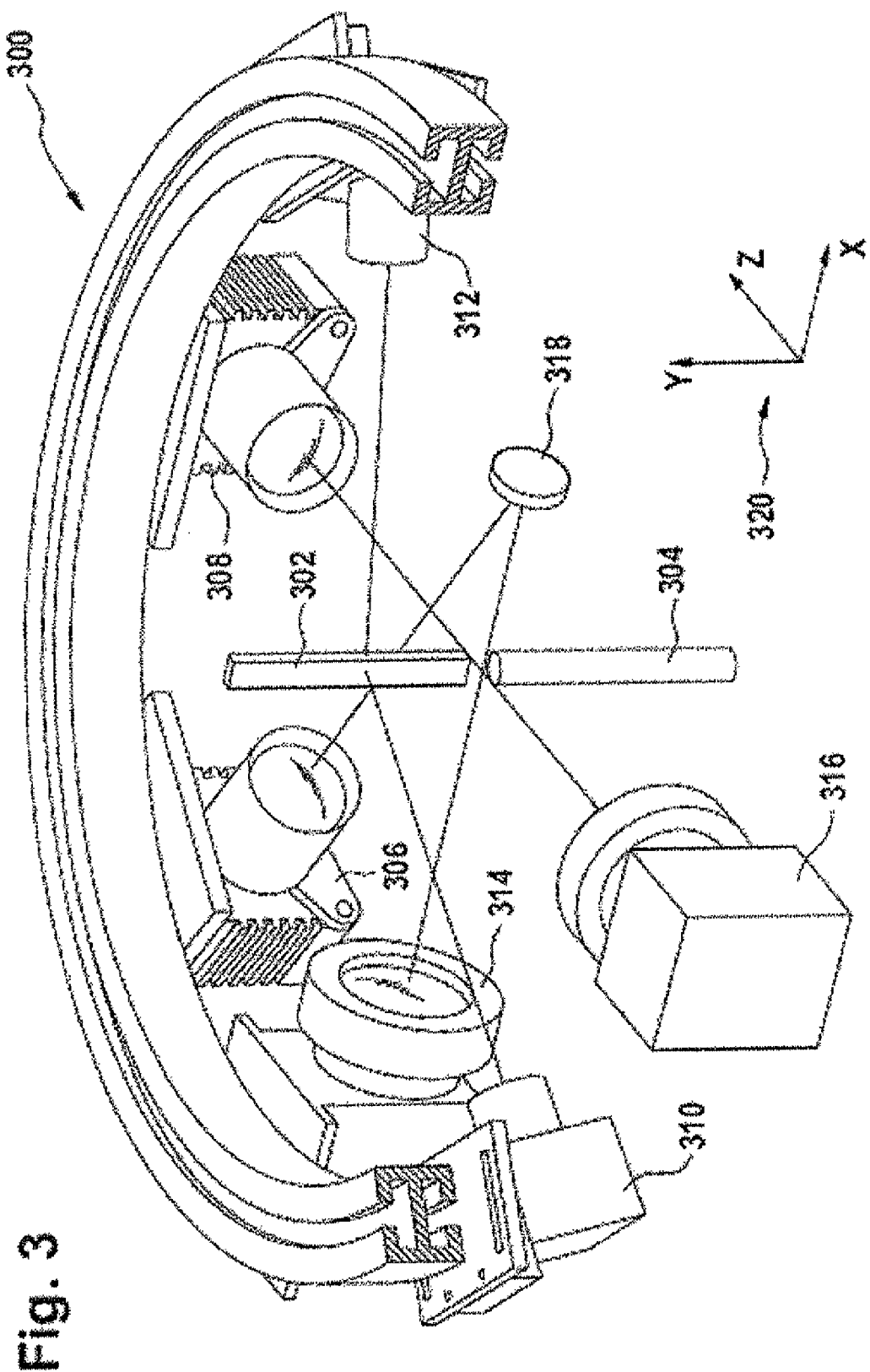
FIG. 3 shows a positioning system for the positioning of the cameras and of the burner.

Turning in detail to the drawings, FIG. 1 shows a block diagram of an apparatus 100 for carrying out a fire test. The apparatus 100 has a test chamber 102 and a computer system 104. The test chamber 102 has a positioning system 128 for a burner 110. Furthermore, the test chamber 102 has a positioning system 130 for a first camera 106 and a holding device 132 for a test piece 112. In the test chamber 102 there is also a second camera 108. The computer system 104 has a screen 114, a microprocessor 116 and a memory 118. The microprocessor 116 of the computer system 104 executes a computer program product 120.

By means of the positioning system 128, the burner 110 can be made to move in all three spatial directions. By means of the positioning system 130, furthermore, the first camera 106 is positioned in such a way that the test piece 112 is optically captured by the first camera 106.

The data of the images of the test piece 112 made by the first camera 106 are transmitted to the computer system 104. The computer program product 120 serves for the image processing of the data of images made by means of the first camera 106. A projected image 122 of the test piece 112 may be displayed for example on the screen 114. By analysis of the projected image 122, the outlines of the test piece 112 can be determined by the computer program product 120. In this way, the position of the test piece 112 in the test chamber can be captured by the image processing and a reference point 124 in the test piece can be determined. The computer program product 120 then controls the positioning system 128 in such a way that the burner 110 is positioned at a prescribed distance 126 from the reference point. Preferably, the first distance 126 between the reference point 124 and the burner 110 is measured with reference to the tip of the burner.

The first distance 126 may be calibrated for example on the basis of a reference image. For this purpose, an image of the test piece 112 and the burner 110 is recorded by means of the first camera 106, the burner having been positioned at the first distance with respect to the reference point 124, for example by an operator of the apparatus. The image data of the reference image are stored by the computer program product 120 in the memory 118. During the flame exposure of the test piece 112 by the burner 110, image data of the burner 110 and of the test piece are continuously captured by the first camera 106 and the computer program product 120 continually calculates from the projected image 122 at a given time of the test piece 112 and of the burner 110 the distance between the burner 110 and the reference point 124 (the reference point 124 is thereby continually re-determined) and compares the distance determined at a given time in the projected image 122 with the distance prescribed in the image data of the reference image. If a discrepancy in this is detected, the computer program product corrects the distance of the burner 110 in the test chamber 102 to the first distance 126.

The second camera 108 serves for capturing the burner flame. For this purpose, the second camera 108 is provided in the test chamber 102 in such a way that the burner flame of the burner 110 can be captured by it, for example before the flame exposure of the test piece 112. The image data recorded by the second camera 108 are processed by the computer program product 120. This involves determining the colour of the flame for example on the basis of the rgb colour model. According to the rgb colour model, a colour is described according to its red, green and blue components (respectively between 0% and 100%). The determined colour of the burner flame is then compared with a prescribed colour of a desired flame. The desired flame in this case corresponds to a burner flame that is set to a prescribed nominal output, for example 50 watts according to EN 60695-11-10. If the burner flame does not correspond to the desired flame, an exchange of the burner for another burner is initiated by the computer program product 120. For this purpose, the positioning system 128 deposits the burner 110 in a burner magazine (not shown here), in which further burners are kept, and removes one of the further burners from the burner magazine, which is then used for the flame exposure of the test piece.

FIG. 2 shows a flow diagram which reproduces the steps of carrying out a burning test on a test piece. In step 200, the image data capture of the test piece with at least one first camera is performed. In step 202, the image data recorded with the at least one first camera are processed, a reference point of the test piece being determined. Furthermore, in step 204, the positioning of a burner at a prescribed first distance from the reference point is performed for the flame exposure of the test piece.

FIG. 3 shows a positioning system 300 for the positioning of the cameras and of the burner. The positioning system has cameras 306, 308, 310 and 312. Furthermore, the positioning system 300 has red light emitters 314 and 316 as well as a mirror 318. The cameras 306 and 308 serve for the image data capture of the test piece 302 and of the burner 304. By using the two cameras 306 and 308, the test piece 302 can be optically captured continuously from two sides. A change in the position and/or form of the test piece, for example an expansion of the test piece along the Y axis (cf. system of coordinates 320) or a shrinkage of the test piece 302 with respect to the Y axis, for example due to burning of the test piece, or a movement of the test piece in the X-Z plane, can consequently be optically captured and correspondingly detected by the image processing. In this way, the reference point of the test piece at a given time can always be determined. Furthermore, the burner 304 can be corrected by the positioning system 300 in such a way that its tip is positioned at the first distance away from the reference point. Furthermore, the cameras 306 and 308 can be made to track in such a way that the cameras 306 and 308 capture the test piece 302 in the middle of the image.

To suppress the detection of the burner flame or to prevent the recording of the test piece by the camera 308 being impaired by a burning test piece, the test piece 302 and the camera 308 are illuminated by the red light emitter 316. As a result, flames are blocked out for the camera 308. Similarly, the red light emitter 314 illuminates the test piece 302 and the camera 306, whereby flames are no longer detected by the camera 306. The light of the red light emitter 314 is in this case deflected by way of the mirror 318, in order that the system 300 can be made somewhat more compact.

With the cameras 310 and 312, it is detected whether the test piece 302 is burning. For this purpose, they are positioned by the positioning system 300 around the test piece in such a way that the test piece 302 can be optically captured by the cameras. The cameras 310 and 312 are colour cameras, which continually deliver images to the image processing, whereby it can be established by analysis of the image data whether the test piece 302 is burning.

Figure 4:
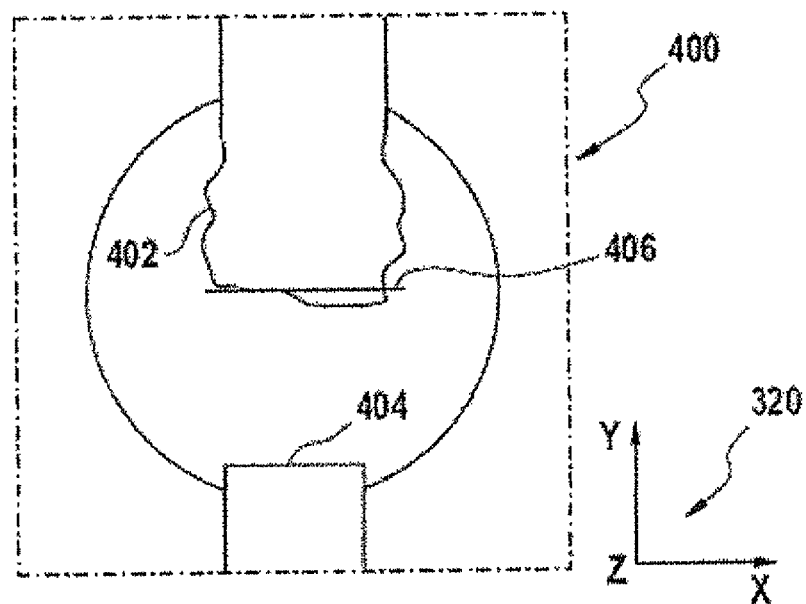
FIG. 4 shows a recording of a first surface side of the test piece.

FIG. 4 shows the recording 400 of a first surface side 402 of the test piece and of the tip of the burner 404. The surface side 402 is oriented along the X-Y plane (cf. system of coordinates 320 from FIG. 3) and may have been recorded for example by the camera 306 (cf. FIG. 3). By the image processing of the recording 400, the outlines of the surface side 402 of the test piece can be determined. On the basis of the information obtained in this way, a first guide line 406, extending horizontally, that is to say along the X axis, can be determined.

Figure 5:
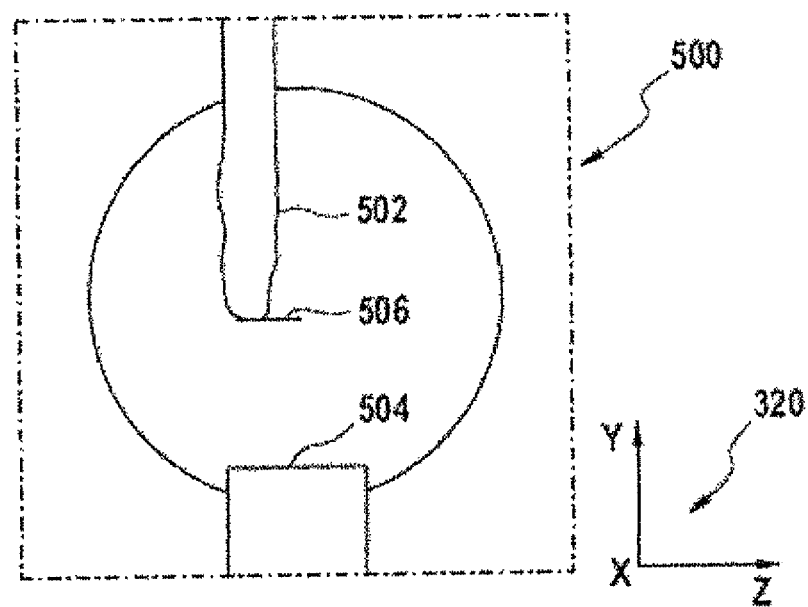
FIG. 5 shows a recording of a second surface side of the test piece, FIG. 6A schematically shows the first surface side of the test piece with a first guide line, FIG. 6B schematically shows the second surface side of the test piece with a second guide line.

FIG. 5 shows a recording 500 of a second surface side 502 of the test piece and of the tip of the burner 504. The surface side 502 is oriented in the Y-Z plane (cf. system of coordinates 320 from FIG. 3) and may have been recorded for example by the camera 308 (cf. FIG. 3). By the image processing of the recording 500, the outlines of the second surface side 502 can be determined. In this way, a second guide line 506, which extends along the Z axis, can be determined for the second surface side.

Figure 6A:
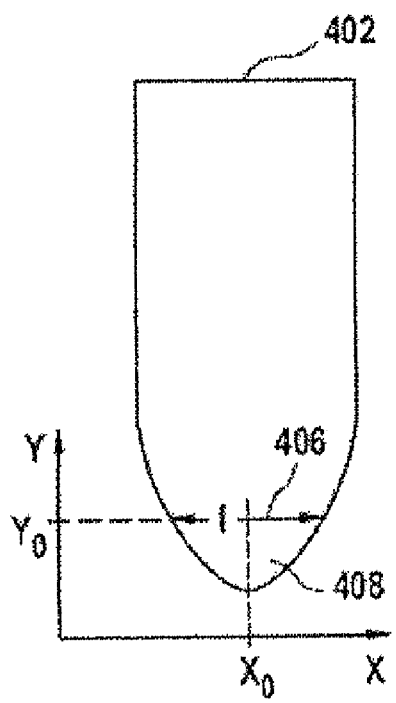
FIG. 6C shows a section through the test piece transversely to its longitudinal axis and through the reference point.

FIG. 6A schematically shows the first surface side 402 with the first guide line 406. The first guide line 406 is determined in such a way that it extends over a prescribed minimum length (l) along with the X axis and as far down as possible with respect to the Y direction through the first surface side 402. Furthermore, a first region 408, which corresponds to pad of the test piece that is located under the first guide line, is determined by the image data processing. If the first region 408 has a minimum height (distance between the lower edge of the test piece and the first guide line 406) and a minimum width (average width of the first region along the X axis), the first region is identified by the image processing as a thread, which is for example an indication of a drip that is about to come away.

Furthermore, two of three coordinates of the reference point (X0, Y0, Z0) are established by the first guide line 406. On the one hand, the Y coordinate of the reference point (Y0) is obtained on the basis that the first guide line extends perpendicularly to the Y axis. The X coordinate of the reference point (X0) is obtained from the X coordinate of the centre point of the first guide line 406.

Figure 6B:
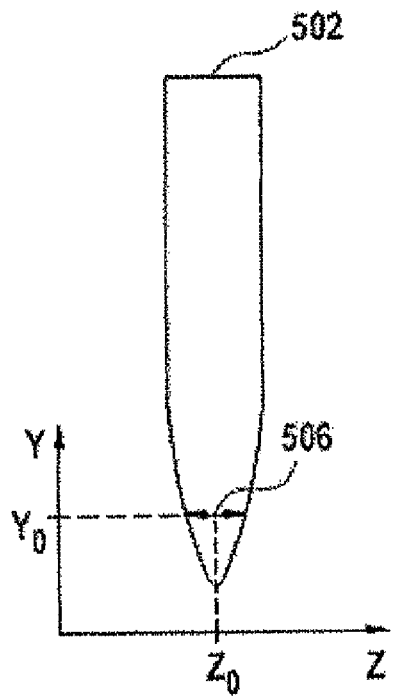

FIG. 6B schematically shows the second surface side 502 with the second guide line 506. On the one hand, the guide line 506 is in this case placed through the second surface side 502 in such a way that it extends at the same height with respect to the Y axis as the first guide line 406. Then, the last missing coordinate for the reference point (Z0) can be established by the second guide line 506. This is obtained from the Z coordinate of the centre point of the guide line 506.

Figure 6C:
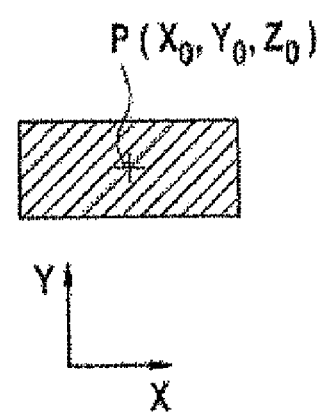

FIG. 6C shows a section through the test piece, formed as a bar and in a substantially rectangular manner, transversely to its longitudinal axis, that is to say a section through the X-Z plane. By determining the reference point as described in FIGS. 6A and 6B, the reference point P (X0, Y0, Z0) consequently lies substantially at the centre of the test piece.

FIG. 7 shows a block diagram of an apparatus 700 for carrying out a fire test. The apparatus 700 has a specimen magazine 702, a programmable controller 704, a computer system 706 and a test chamber 708. The specimen magazine 702 contains a supply 710 of test pieces that are to be subjected to a fire test. Furthermore, the specimen magazine 702 includes a measuring device 712. The stored test pieces have in this case for example specimen dimensions of 12.7 mm×127 mm and a thickness in the range from 0.5 mm to 3.5 mm. The supply 710 of test pieces comprises for example 250 test pieces. The supply 710 is stored in the specimen magazine 702 under the climatic conditions that are prescribed by the standard on which the test is based. For example, standard EN 60695-11-10 prescribes storage of the supply 710 for at least 48 hours at (23±2)° C. and a humidity level of (50±5)%.

To carry out the fire test on a test piece from the supply 710, a test piece 714 is removed from the specimen magazine and fed to the test chamber 708. Before that, the thickness of the test piece is also determined by means of the measuring device 712. The repositioning of the test piece 714 from the specimen magazine into the test chamber may in this case take place fully automatically and under the control of the programmable controller 704.

The test chamber 708 has a holding device 716 for the test piece 714. Furthermore, the test chamber 708 has a burner positioning system 718, camera systems 720, a magazine 722 for a roll of wadding and positioning means 724 for wadding. The test piece 714 is taken up by the holding device 716 and fixed in such a way that it can be captured by the camera systems 720. The burner positioning system 718 may also position a burner 728 at the first prescribed distance with reference to a reference point determined by means of an image processing component 726 of the computer system 706, as described above. The camera systems 720 in this case continually supply image data of the test piece 714 and of the burner 728 that is used for the flame exposure of the test piece 714 to the image processing 726, so that, at the initiation of the image processing 726 and under the control of the programmable controller 704, the burner positioning system 718 can keep the burner 728 at the first distance from the test piece even during the flame exposure of the test piece 714.

At least one roll of wadding is kept in the magazine 722 for a roll of wadding, from which wadding is detached, for example in the dimensions 50 mm×50 mm×6 mm, and fed to the positioning means 724 by means of a separating and feeding system. The wadding is then placed under the test piece by the positioning means 724. The wadding serves as an indicator of burning drips. For this purpose, the wadding is preferably loosened in the separating and feeding system, for example by blasting with a jet of nitrogen. Furthermore, nitrogen nozzles are provided for blowing out a burning pad of wadding.

The apparatus 700 may also have a scrap magazine (not represented here), for the disposal of used wadding and used test pieces, in each case separated.

Furthermore, the test apparatus 700 may have a magazine in which holding devices are kept. The holding devices, such as holding device 716, typically have a gripper, with which the test piece 714 is clasped. The gripper may become soiled, for example if the test piece 714 burns away through to the gripper. By keeping a number of holding devices in the magazine, the holding device can therefore be exchanged fully automatically, and without repair of the installation being necessary. The scrap magazine is also used here for disposal of the soiled holding devices, separated from the wadding and the test pieces. Furthermore, one or more nitrogen nozzles may be provided around the gripper and the test piece to be exposed to a flame, for blowing out a burning test piece.

FIG. 8 shows a flow diagram which shows essential steps for carrying out a vertical burning test according to EN 60695-11-10. In step 800, the flame exposure of the test piece for 10 seconds begins. During the flame exposure, in step 802 it is established by means of image processing whether formation of a drip thereby takes place. If no drip is detected during the flame exposure, in step 804 the burner is made to move away to the side after the 10 seconds have elapsed, so that it does not have any influence on the test piece. If in step 802 formation of a drip is detected, in step 806 the burner is made to move away to the side and tilted, so that it continues to expose the test piece to a flame. In step 808 it is detected if the drip comes away from the test piece. If the drip touches the burner tube, in step 810 a change of burner is performed and the method is re-started again in step 800 with a new test piece. If in step 808 it is detected that the drip coming away has not influenced the burner, the flame exposure is continued until the 10 seconds have elapsed, and then in step 804 the burner is made to move away to the side after the flame exposure.

In step 812, the burning time of the test piece is detected. If the test piece goes out within 35 seconds, the method is continued with step 826, the method steps 800 to 812 being carried out once again on the same test piece to determine a second burning time. If the test piece does not go out after 35 seconds, in step 814 the flame is observed for a further 35 seconds. If in step 816 it is established after 35 seconds have elapsed that the flame has gone out, the method is continued with step 826, method steps 800 to 812 being carried out once again on the same test piece to determine a second burning time. If in step 816 it is established that the flame has not gone out, in step 818 the flame is extinguished, for example by blasting the test piece with nitrogen, Furthermore, in step 820 it is determined whether a drip has come away from the burning test piece. If this is the case, in step 822 the pad placed under the test piece is exchanged for a new pad and the method is completed with step 824. Otherwise, after step 820, the method is completed right away with step 824.

Figure 9:
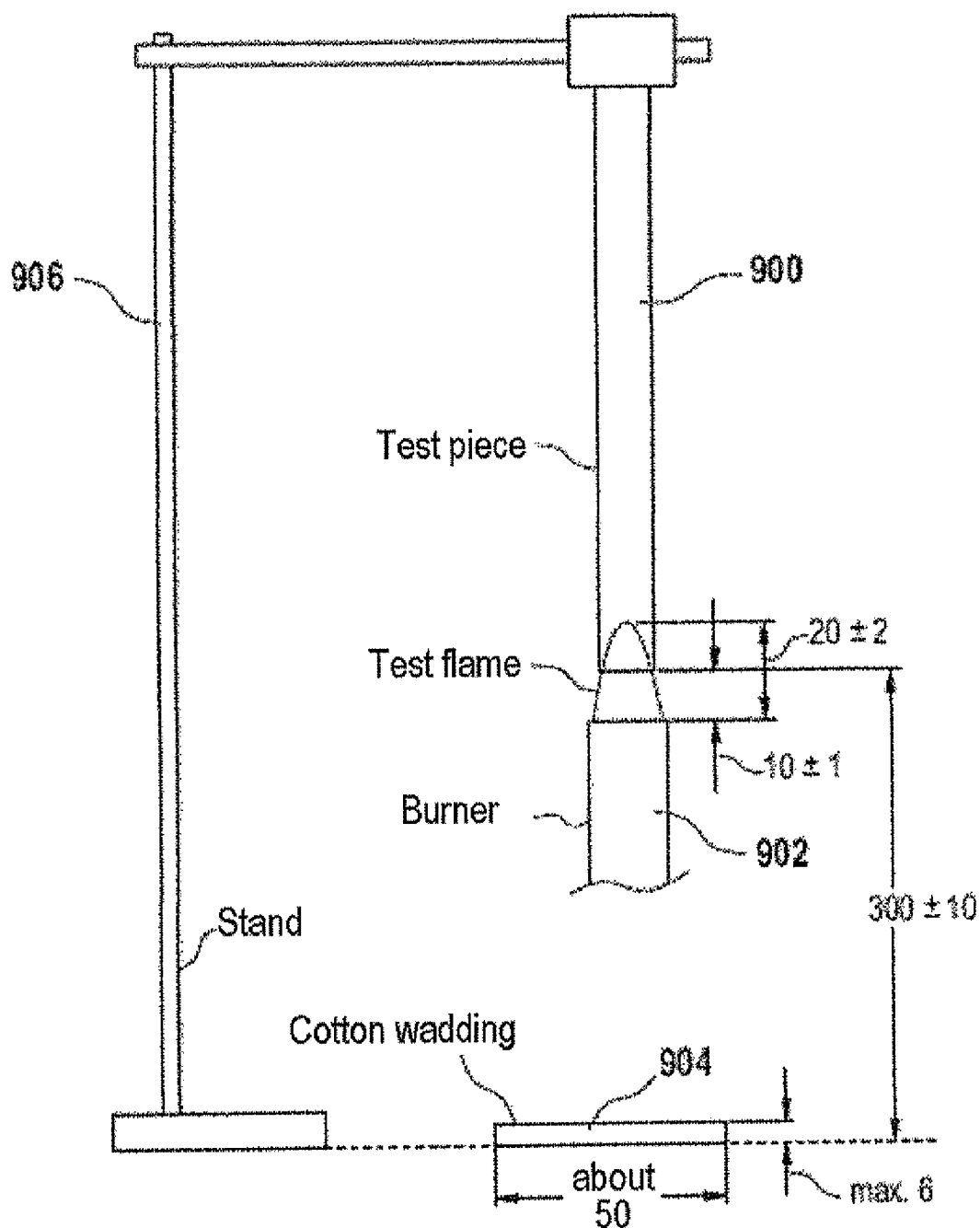

FIG. 9 schematically shows the arrangement of the test piece 900 and the burner 902 in the case of the vertical burning test according to EN 60695-11-10. The test piece 900 is in this case formed as a rectangular bar. It is suspended from the fixing means 906 (here a stand) in such a way that its longitudinal axis is vertically aligned.

The tip of the burner is located at a distance of 10±1 mm under the lower edge of the test piece, the longitudinal axis of the test piece 900 coinciding with the centre axis of the burner 902. Furthermore, cotton wadding 904 is placed at a distance of 300±10 mm from the lower edge of the test piece. In this case, the cotton wadding 904 has the dimensions 50×50×6 mm.

Before the flame exposure and as long as the test piece is not burning, the reference point determined by the image processing corresponds substantially to the point of intersection of the longitudinal axis of the test piece 900 with the lower edge of the test piece 900. If, however, the test piece is burning or the test piece expands on account of the effect of the flames, the reference point changes its position. The distance between the tip of the burner and the reference point can be controlled to 10±1 mm by the correction of the burner 902 by means of the burner positioning system not shown here (cf. FIG. 7).

Figure 10:
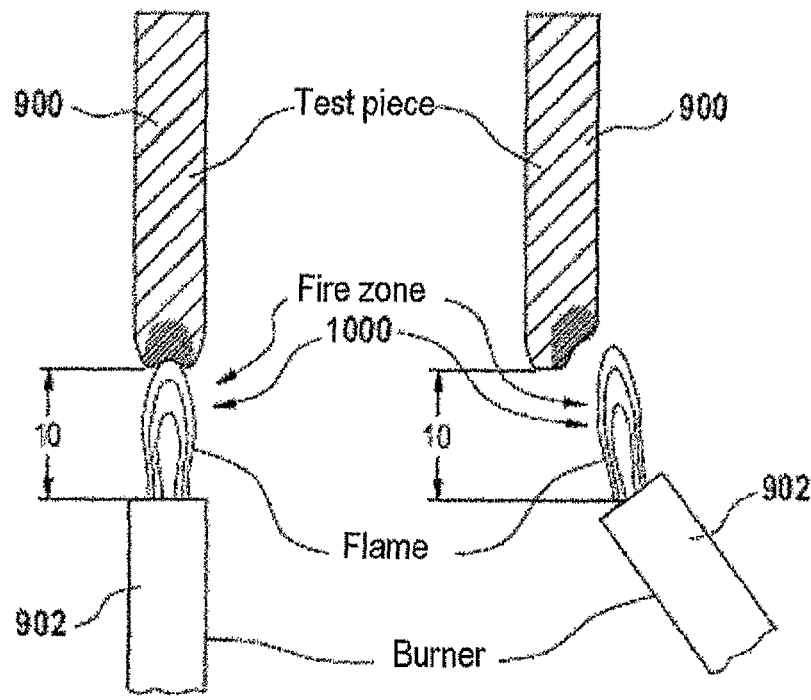

FIG. 10 schematically shows the tilting away of the burner 902 during the flame exposure of the test piece 900 (cf. FIG. 9) to avoid influencing of the burner flame by the drip coming away from the test piece. The left-hand part of FIG. 10 thereby shows the burner 902 at a distance of 10 mm under the test piece 900, as described in FIG. 9. The fire zone 1000 between the burner 902 and the test piece 900 is captured by the image processing of the image data recorded by the at least one first camera (cf. FIG. 1). In this case, the first camera is preferably a high-speed camera, so that parts falling from the test piece 900 can be detected by the image processing. If such a falling part is detected, i.e. if a drip is detected, the burner is pivoted away to the side, as shown in the right-hand part of FIG. 10, so that the drip cannot influence the burner flame. In this case, the centre axis of the burner is inclined by up to 45° and the burner is moved away from the test piece to the side, but further flame exposure of the test piece takes place and the distance in the vertical direction between the tip of the burner and the reference point is controlled to 10 mm. Once the drip has passed the fire zone 1000, the burner is moved again into the position represented in the left-hand part of the image.

Figure 11:
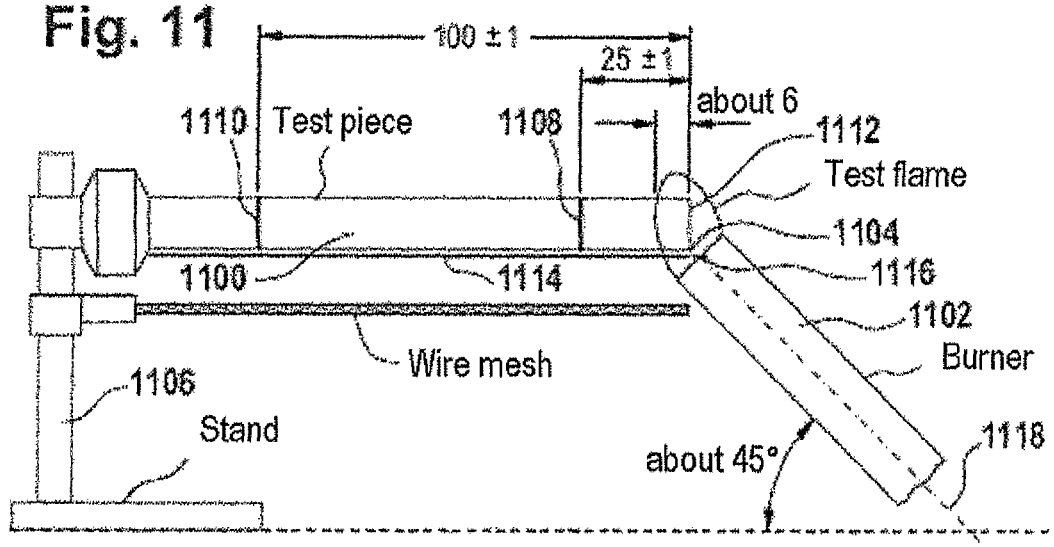

FIG. 11 schematically shows the arrangement of the test piece 1100 and the burner 1102 in the case of the horizontal burning test according to EN 60695-11-10. The test piece is in this case formed as a substantially rectangular bar. The test piece 1100 is held by a fixing means 1106 in such a way that its longitudinal axis is horizontally aligned and its transverse axes are aligned substantially at an angle of 45° to the horizontal. A first mark 1108 and a second mark 1110 are provided on the test piece. The first mark 1108 is located at a distance of 25±1 mm from a surface 1112 of the test piece and a second mark 1110 is located at a distance of 100±1 mm from the surface 1112. A reference line 1114 is determined by the optical capture of the test piece by the first camera (not represented here) and by subsequent image processing of the image data recorded in this way, the reference line corresponding to the lower edge of the test piece 1110. The reference point 1104 is determined by the image processing as the point of intersection between the reference line 1114 and the surface 1112.

The burner 1102 is then positioned for the flame exposure of the test piece 1100 in such a way that its centre axis 1118 extends at an angle of about 45° to the vertical and that the tip 1116 of the burner lies on the (extended) reference line 1114, the distance between the tip 1116 and the reference point 1104 corresponding to a prescribed value. The prescribed value may in this case be set in such a way that the free end of the test piece is exposed to a flame over a length of about 6 mm. During the flame exposure, the test piece is also optically captured by at least one camera and the image data obtained in this way are evaluated by means of the image processing. As a result, the point in time at which the flames reach the first mark 1108 and the second mark 1110 can be determined. Alternatively, at which point in time after reaching the first mark 1108 the flames go out, and how long the length of damage to the test piece is in this case, can be determined, for example by comparison with a reference image of an undamaged test piece. On the basis of flame exposure of a number of test pieces, the data obtained in this way can be used to classify the material of which the test pieces consist in the classes prescribed by the standard EN 60695-11-10.

Thus, a method and apparatus for carrying out a burning test on a test piece are disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A method for carrying out a burning test on a test piece, comprising:
   initiating a flame exposure of the test piece with a burner;
   continuously capturing image data of the test piece with at least one first camera during the flame exposure of the test piece;
   continuously determining a reference point on the test piece during the flame exposure of the test piece by processing the continuously captured image data of the test piece; and
   positioning the burner at a prescribed first distance from the reference point based on the continuous determination of the reference point during the flame exposure of the test piece.

2. The method according to claim 1, further comprising suppressing the detection of the burner flame with an interference bandpass filter of the at least one first camera.

3. The method according to claim 1, further comprising irradiating the at least one first camera with a red light emitter for suppressing the detection of the burner flame.

4. The method according claim 3, the at least one first camera including a polarization filter, the light from the red light emitter being linearly polarized, the polarization filter of the first camera being aligned in such a way that it has a low filtering effect for the linearly polarized light.

5. The method according claim 1, further comprising:
   processing image data of the burner flame captured with at least one second camera, the colour of the burner flame being determined from the captured image data of the burner flame captured, the colour being compared with the colour of a desired flame;
   exchanging the burner upon detecting from the image processing that the colour of the burner flame does not correspond to the colour of the desired flame.

6. The method according to claim 1, further comprising repositioning the test piece from a specimen magazine into a position in which the test piece can be optically captured by the at least one first camera and can be exposed to the flame of the burner, the specimen magazine being adapted to receive a plurality of test pieces.

7. The method according to claim 1, further comprising:
   processing image data of the test piece captured with at least one third camera;
   determining on the basis of the captured image data with the at least one third camera whether the test piece is burning.

8. The method according to claim 7, further comprising determining, using the captured image data with the at least one third camera, whether the test piece is incandescing.

9. The method according to claim 1, the test piece being formed as a substantially rectangular bar, the test piece being suspended from a fixing means, the longitudinal axis of the test piece being vertically aligned, image data of a first surface side and a second surface side being recorded with the at least one first camera, the first and second surface sides being aligned parallel to the longitudinal axis, the first and second surface sides being oriented substantially perpendicularly to each other, a first guide line, extending horizontally along the first surface side, and a second guide line, extending horizontally along the second surface side, being determined by the image processing, the reference point corresponding to the point of intersection of the first and second guide lines projected towards the middle of the bar.

10. The method according to claim 9, the first guide line having at least a first prescribed minimum length, the first guide line extending as far down as possible through the first surface side of the upright test piece, the second guide line extending at the same height as the first guide line.

11. The method according to claim 9, further comprising:
    capturing a first region of the first surface side, the first region comprising the first surface side under the first guide line;
    detecting a thread if the region has a prescribed minimum height and a prescribed minimum width.

12. The method according to claim 1, further comprising:
    capturing image data of a second region by the at least one first camera, the second region lying between the test piece and the burner;
    processing the captured image data with the at least one first camera, a drip being detected if a part of the test piece that is moving in the second region is detected in the image data, the part having a prescribed minimum size and falling at a prescribed minimum rate or greater.

13. The method according to claim 1, further comprising positioning cotton wadding at a prescribed second distance under the test piece, the cotton wadding being optically captured by at least one fourth camera or an optical detector, and determining by processing the captured image data of the cotton wadding whether a drip coming away from the test piece ignites the cotton wadding.

14. The method according to claim 1, further comprising:
    exposing the test piece to a flame for a prescribed first time period, the burner being positioned at the prescribed first distance under the reference point, the centre axis of the burner being vertically aligned and the first distance being corrected during the flame exposure;
    repositioning the burner after the first time period has elapsed, so that the burner no longer has any influence on the test piece;
    determining a first burning time of the test piece, the first burning time corresponding to the time span between the end of the first time period and the point in time that the test piece is extinguished;
    exposing the test piece to a flame for a prescribed second time period;
    determining the second burning time of the test piece, the second burning time corresponding to the time span between the end of the second time period and the point in time that the test piece is extinguished, the centre axis of the burner being tilted during the flame exposure of the test piece if a drip is detected, the burner also optionally being removed from the test piece in a horizontal direction of movement, so that the drip does not influence the burner flame, and the burner being positioned again at the first distance under the test piece with a vertically aligned centre axis as soon as the drip has come away; storing the first and second burning times and optionally storing the information that a drip has come away from the test piece, and optionally storing the information that cotton wadding under the test piece has been ignited by a drip coming away.

15. The method according to claim 14, it being determined by the image processing, by means of the image data recorded from the test piece, whether the test piece burns or incandesces through to the fixing means.

16. The method according to claim 14, further comprising repeating the method for a total of five test pieces, a classification of the material of which the five test pieces consist in the classes V-0, V-1 or V-2 according to EN 60965-11-10 being carried out, the classification being carried out on the basis of the first and second burning times, on the basis of the determination whether one or more of the five test pieces has burned through or incandesced through to the fixing means, and on the basis of a detected inflammation of the cotton wadding.

17. The method according to claim 1, further comprising:
exposing the test piece to a flame five times, in each case for a prescribed third time period, the burner being positioned at the prescribed first distance under the reference point, the centre axis of the burner being aligned at an angle of approximately 20° to the vertical, the first distance being corrected during the flame exposure, the flame exposure being interrupted in each case by repositioning the burner for a prescribed fourth time period, the burner having no influence on the test piece during the fourth time period, the burner also optionally being removed from the test piece in a horizontal direction of movement, so that a drip coming away does not influence the burner flame, and the burner being positioned again at the first distance with respect to the reference point under the test piece as soon as the drip has come away;
determining a third burning time of the test piece after the fifth flame exposure and storing the third burning time, the third burning time corresponding to the time period between the completion of the fifth flame exposure and the point in time that the test piece is extinguished.

18. The method according to claim 17, the method being carried out for a total of five test pieces, the third burning times of the five test pieces and/or a detected inflammation of the cotton wadding being used for a classification of the material of which the test pieces consist, according to DIN EN 60695-11-20.

19. The method according to claim 1, the test piece being formed as a substantially rectangular bar, the test piece being fixed in such a way that the longitudinal axis of the test piece extends substantially horizontally and the transverse axes are aligned substantially at an angle of 45° to the horizontal, a first mark and a second mark being provided on the test piece transversely to the longitudinal axis, the first mark being a prescribed fourth distance away from a third surface side of the test piece, the second mark being a prescribed fifth distance away from the third surface side of the test piece, the longitudinal axis extending perpendicularly to the third surface side, a third guide line for the test piece being determined by the image processing, the third guide line extending along the lower edge of the material, the reference point being the point of intersection of the third guide line with the third surface side, the burner being positioned at the first distance from the reference point in the positioning, so that the centre axis of the burner intersects the third guide line at an angle of 45° and the tip of the burner lies on the extended guide line.

20. The method according to claim 19, further comprising:
exposing the test piece to a flame during a prescribed fifth time period or until the flame front reaches the first mark;
determining a sixth time period, the sixth time period corresponding to the time span until the flame front starting from the first mark reaches the second mark, or the time span until the flame starting from the first mark goes out;
determining a length of damage to the test piece if the flame front goes out before reaching the second mark;
storing the sixth time period and optionally the length of damage.

21. The method according to claim 20, the method being carried out for three test pieces, and classifying the material on which the test pieces are based in the classes HB40 or HB75 according to DIN EN 60695-11-10, using the sixth time periods, determined for the three test pieces, and the lengths of damage.

22. An apparatus for carrying out a burning test on a test piece, the apparatus comprising:
at least one first camera for continuously capturing image data of the test piece during a flame exposure of the test piece;
means for continuously processing the image data recorded with the at least one first camera during the flame exposure of the test piece;
means for continuously determining a reference point of the test piece on the basis of the image data during the flame exposure of the test piece;
means for continuously positioning a burner at a prescribed first distance from the reference point during the flame exposure of the test piece, the burner adapted to provide for the flame exposure of the test piece.

23. The apparatus according to claim 22, further comprising:
a burner depot, a number of burners being kept ready for use in the burner depot;
at least one second camera;
means for the image processing of the image data of the burner flame recorded with the at least one second camera, the colour of the flame being comparable with the colour of a desired flame;
means for exchanging the burner for another burner in the depot if the colour of the burner flame does not correspond to the colour of the desired flame.

24. The apparatus according to claim 22, further comprising:
a specimen magazine for receiving a large number of test pieces;
a scrap magazine;
means for repositioning the test piece from the specimen magazine into a fire testing position, in which the test piece can be optically captured by the at least one first camera and can be exposed to a flame by the burner;
means for repositioning the test piece from the fire testing position into the scrap magazine.

25. The apparatus according to claim 22, further comprising:
at least one third camera;
means for the image processing of the image data of the test piece recorded with the at least one third camera;
means for determining on the basis of the image data recorded with the third camera whether the test piece is burning.

26. The apparatus according to claim 25, further comprising means for determining on the basis of the image data recorded with the least one third camera whether the test piece is incandescing.

27. The apparatus according to claim 22, the test piece being formed as a substantially rectangular bar, the test piece being fixed to the fixing means with a vertically aligned longitudinal axis, image data of a first surface side and a second surface side being recorded with the at least one first camera, the first and second surface sides being aligned parallel to the longitudinal axis, the first and second surface sides being oriented substantially perpendicularly to each other, a first guide line, extending horizontally along the first surface side, and a second guide line, extending horizontally along the second surface side, being determinable by the means for image processing, the reference point corresponding to the point of intersection of the first guide line and the second guide line projected towards the middle of the bar.

28. The apparatus according to claim 27, the first guide line being determinable by the means for image processing in such a way that the first guide line has at least a first prescribed minimum length, the first guide line extending as far down as possible through the first surface side of the upright test piece, the second guide line extending at the same height as the first guideline.

29. The apparatus according to claim 27, further comprising:
   means for capturing a first region of the first surface side, the first region comprising the first surface side under the first guide line;
   means for detecting a thread if the region has a prescribed minimum height and a prescribed minimum width.

30. The apparatus according to claim 22, further comprising:
   means for optically capturing a second region by the at least one first camera, the second region lying between the test piece and the burner;
   means for the image processing of the image data recorded with the at least one first camera, a drip being detectable if a part of the test piece that is moving in the second region is detected in the image data, if the part of the test piece has a prescribed minimum size and is falling at a prescribed minimum rate or greater.

31. The apparatus according to claim 22, further comprising:
   at least one fourth camera or some other optical detector;
   means for positioning cotton wadding at a prescribed second distance under the test piece, the cotton wadding being optically captured by the at least one fourth camera or the detector;
   means for the image processing of the image data captured with the at least one fourth camera or the detector for determining whether a drip coming away from the test piece ignites the cotton wadding.

32. The apparatus according to claim 22, further comprising:
   means for exposing the test piece to a flame for a prescribed first time period, the burner being positioned at a prescribed first distance under the reference point, the centre axis of the burner being vertically aligned;
   means for controlling the distance between the burner and the reference point to the first distance;
   means for repositioning the burner after the first time period has elapsed, so that the burner no longer has any influence on the test piece;
   means for determining a first burning time of the test piece, the first burning time corresponding to the time span between the end of the first time period and the point in time at which the test piece is extinguished;
   means for exposing the test piece to a flame for a prescribed second time period;
   means for determining the second burning time of the test piece, the second burning time corresponding to the time span between the end of the second time period and the point in time at which the test piece is extinguished;
   means for tilting the centre axis of the burner during the flame exposure of the test piece if a drip is detected;
   means for repositioning the burner along a horizontal direction of movement, so that the drip does not influence the burner flame;
   means for returning the burner into the position with a vertically aligned centre axis at the first distance from the reference point as soon as the drip has come away;
   means for storing the first and second burning times and the information that a drip has come away from the test piece;
   means for storing the information that the cotton wadding positioned under the test piece has been ignited by a drip coming away.

33. The apparatus according to claim 32, further comprising means for classifying the test piece in the classes V-0, V-1 or V-2 according to EN 60965-11-10.

34. The apparatus according to one of claim 22, further comprising:
   means for exposing the test piece to a flame five times, in each case for a prescribed third time period, the burner being positioned at the prescribed first distance under the reference point;
   means for positioning the burner with a centre axis aligned at an angle of approximately 20° to the vertical at the first distance under the test piece;
   means for controlling the distance between the burner and the reference point to the first distance;
   means for interrupting the flame exposure by repositioning the burner for a prescribed fourth time period, the burner having no influence on the test piece during the fourth time period;
   means for repositioning the burner along a horizontal direction of movement, so that a drip coming away does not influence the burner flame, and the burner being positioned again at the first distance with respect to the reference point under the test piece as soon as the drip has come away;
   means for determining a third burning time of the test piece after the fifth flame exposure;
   means for storing the third burning time, the third burning time corresponding to the time period between the completion of the fifth flame exposure and the point in time that the test piece is extinguished.

35. The apparatus according to claim 34, the third burning times of the five test pieces and/or a detected inflammation of the cotton wadding being used for a classification of the material of which the test pieces consist according to DIN EN 60695-11-20.

36. The apparatus according to claim 22, the test piece being formed as a substantially rectangular bar, the test piece being fixed in such a way that the longitudinal axis of the test piece extends substantially horizontally and the transverse axes are aligned substantially at an angle of 45° to the horizontal, a first mark and a second mark being provided on the test piece transversely to the longitudinal axis, the first mark being a prescribed fourth distance away from a third surface side of the test piece, the second mark being a prescribed fifth distance away from the third surface side of the test piece, the longitudinal axis extending perpendicularly to the third surface side, a third guide line for the test piece being determinable by the means for the image processing, the third guide line extending along the lower edge of the material, the reference point being the point of intersection of the third guide line with the third surface side, the burner being positioned at the first distance from the reference point in the positioning, so that the centre axis of the burner intersects the third guide line at an angle of 45° and the tip of the burner lies on the extended guide line.

37. The apparatus according to claim 36, further comprising:
   means for exposing the test piece to a flame during a prescribed fifth time period until the flame front reaches the first mark;
   means for determining a sixth time period, the sixth time period corresponding to the time span until the flame front starting from the first mark reaches the second mark or until the flame goes out;
   means for determining a length of damage to the test piece if the flame front goes out before reaching the second test mark;
   means for storing the sixth time period and optionally the length of damage.

38. The apparatus according to claim 37, also with means for classifying the plastic in the classes HB40 or HB75 according to DIN EN 60695-11-10, using the sixth time periods, determined for 3 test pieces, and the lengths of damage.

39. A system for carrying out a burning test on a test piece, the system comprising:
   a holding device for holding the test piece during a flame exposure of the test piece;
   a camera for continuously capturing image data of the test piece during the flame exposure of the test piece;
   a positioning system for continuously positioning a burner relative to the test piece during the flame exposure of the test piece;
   a computer system in communication with the camera and the positioning system, the computer system comprising a processor and a memory; and
   a computer program product stored on the memory of the computer system and executable by the processor to:
      continuously process the image data during the flame exposure of the test piece,
      continuously determine a reference point on the test piece during the flame exposure of the test piece,
      continuously calculate a distance between the burner and the reference point of the test piece during the flame exposure of the test piece, and
      instruct the positioning system to correct the position of the burner relative to the reference point during the flame exposure of the test piece to satisfy a prescribed distance from the reference point.

* * * * *

UNITED STATES PATENT AND TRADEMARK OFFICE
CERTIFICATE OF CORRECTION

PATENT NO. : 7,894,066 B2  
APPLICATION NO. : 12/172353  
DATED : February 22, 2011  
INVENTOR(S) : Martin Behrendt et al.

Page 1 of 1

It is certified that error appears in the above-identified patent and that said Letters Patent is hereby corrected as shown below:

On the Title Page:

At field (30), "10 2007 032 665" should be -- 102007032665.5 --.

Signed and Sealed this
Eighth Day of November, 2011

David J. Kappos
*Director of the United States Patent and Trademark Office*